E. R. WHITNEY.
Hay-Loader.
No. 165,902. Patented July 20, 1875.
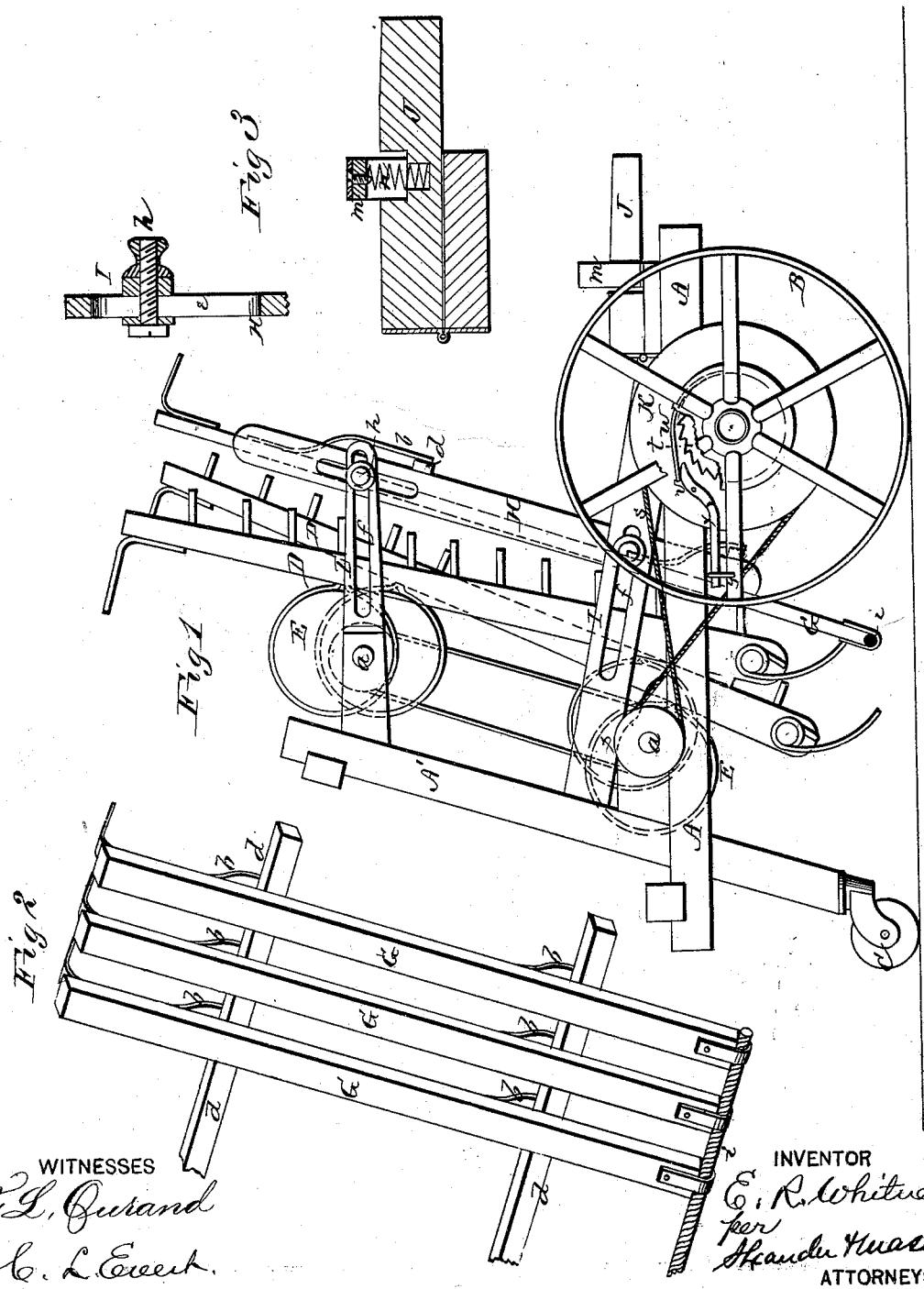

UNITED STATES PATENT OFFICE.

EDWIN R. WHITNEY, OF MAGOG, CANADA, ASSIGNOR TO GEORGE M. MORTON AND FRANK H. MORTON, OF CHICOPEE, MASSACHUSETTS.

IMPROVEMENT IN HAY-LOADERS.

Specification forming part of Letters Patent No. 165,902, dated July 20, 1875; application filed December 28, 1874.

*To all whom it may concern:*

Be it known that I, EDWIN R. WHITNEY, of Magog, Province of Quebec, Canada, in the county of Stanstead, have invented certain new and useful Improvements in Hay-Loaders; and do hereby declare that the following is a full, clear, and exact description thereof, reference being had to the accompanying drawings and to the letters of reference marked thereon, making a part of this specification.

My present invention is intended as an improvement upon a hay-loader for which Letters Patent were granted to me, dated December 15, 1874, No. 157,899; and it consists, first, in the devices for adjusting or shifting the flexible bars; second, in connecting the ends of the flexible bars with a rope securely fastened thereto.

In order to enable others skilled in the art to which my invention appertains to make and use the same, I will now proceed to describe its construction and operation, referring to the annexed drawing, in which—

Fig. 1 is a side elevation of the hay-loader embodying my improvements. Figs. 2 and 3 are detached views of certain parts thereof.

A represents the main frame of my machine, supported upon driving-wheels B B. On the rear part of the main frame A is an inclined frame, A', the side beams of which are extended below the main frame, and their lower ends provided with casters c c to keep the machine always supported at proper height, so that the lifting-teeth will not scratch the ground. a a represent the two shafts provided with eccentrics E E for operating the rake-bars D D in the same manner as described in my former patent, above referred to. G G represent the flexible bars connected by means of springs b b, with horizontal bars d d, and these bars are securely secured to side bars H H. The side bars H H are provided, near their ends, with slots e e, through which pass tightening-screws h h, said screws passing also through slots f f in arms I I, which projects from the frame-work A A', as shown. By means of the slotted side bars H, slotted arms I, and screws h h, the flexible bars G may be adjusted or shifted back and forth, and up or down, as required from the rake or lifting-bars D D, which carry up the hay. The lower ends of the flexible bars G G are connected by a rope, i, or its equivalent, securely fastened to the end of each bar, in order to allow said flexible bars to yield at all times, and to keep the hay from clogging between the ends of the bars.

With these improvements the machine can do its work easy, in both winrows and tambles or cocks of hay, or light hay just from the mowing-machine, and can readily be changed for either purpose.

J represents the tongue, the rear end of which is hinged to a cross-bar on the main frame A, and passes through a metal frame, or staple, m, attached to said cross-bar, and a spiral spring, n, is arranged in said frame, bearing on the tongue, as shown in Fig. 3, by which means the machine can be drawn without tipping forward and back when drawn over rough ground. The shafts a a, upon which the eccentrics E are placed, are connected by means of a rope or belt passing over pulleys on the shafts, and the lower shaft is at each end provided with a pulley, p, connected by a cord or chain, s, with a pulley or grooved wheel, K, placed upon the axle on the inside of the wheel B. The pulley K is on the outer side provided with a ratchet-wheel, t, into which takes a pawl, v, said pawl being pivoted to the hub, or to a disk attached to the inner end of the hub, of the wheel, and pressed against or into the ratchet-wheel by a spring, w. The pawl v is formed with a handle, x, which may be drawn back, and a ring, y, on the spoke of the wheel is passed over the end of this handle, thereby holding the pawl out of the ratchet-wheel, and throwing the machine out of gear.

By this simple plan it is easily operated, and the construction is very simple and cheap.

By these improvements, as above described, the machine is rendered complete for all purposes in the hay-field.

Having thus fully described my invention, what I claim as new, and desire to secure by Letters Patent, is—

1. The combination of the slotted arms I I, slotted side bars H H, having the flexible bars G G connected to them, and the tightening-screws $h\ h$, substantially as and for the purposes herein set forth.

2. The combination of the flexible bars G G, and the rope $i$, or its equivalent, attached to and connecting the lower ends of said bars, substantially as and for the purposes herein set forth.

In testimony that I claim the foregoing I have hereunto set my hand this 3d day of December, 1874.

EDWIN R. WHITNEY.

Witnesses:
FRED. N. WITHREL,
GEO. S. TAYLOR.